US009668168B2

(12) United States Patent
Pathmasuntharam et al.

(10) Patent No.: US 9,668,168 B2
(45) Date of Patent: May 30, 2017

(54) METHOD AND DEVICE FOR MOBILE DATA OFFLOAD

(75) Inventors: Jaya Shankar Pathmasuntharam, Singapore (SG); Anh Tuan Hoang, Singapore (SG); Robert Hsieh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 403 days.

(21) Appl. No.: 13/979,897

(22) PCT Filed: Jan. 17, 2012

(86) PCT No.: PCT/SG2012/000016
§ 371 (c)(1),
(2), (4) Date: Jan. 2, 2014

(87) PCT Pub. No.: WO2012/099541
PCT Pub. Date: Jul. 26, 2012

(65) Prior Publication Data
US 2014/0105007 A1  Apr. 17, 2014

(30) Foreign Application Priority Data

Jan. 17, 2011  (SG) ............... 201100315-9

(51) Int. Cl.
*H04W 12/06*  (2009.01)
*H04W 88/08*  (2009.01)
(Continued)

(52) U.S. Cl.
CPC ..... *H04W 28/0289* (2013.01); *H04L 12/2856* (2013.01); *H04L 63/08* (2013.01);
(Continued)

(58) Field of Classification Search
None
See application file for complete search history.

(56) References Cited

U.S. PATENT DOCUMENTS

2002/0078384 A1  6/2002 Hippelainen
2004/0152417 A1  8/2004 Kim et al.
(Continued)

FOREIGN PATENT DOCUMENTS

WO  WO2010030950  3/2010

OTHER PUBLICATIONS

Air 802, FCC Rules and Regulations, IEEE 80211 a/b/g Standards and Channel Assignments 1 (Last visited Sep. 9, 2014), http://www.air802.com/files/FCC-Rules-and-Regulations.
(Continued)

*Primary Examiner* — Michael J Moore, Jr.
*Assistant Examiner* — Duc Duong
(74) *Attorney, Agent, or Firm* — K. David Crockett, Esq.; Niky Economy Syrengelas, Esq.; Crockett & Crockett, PC (57) ABSTRACT

Embodiments provide a mobile data offload method for associating a mobile client device with a wireless access point. The method may include transmitting a first authentication request from the mobile client device to the wireless access point via a first network being a Cellular Wide Area radio communication network; transmitting a second authentication request from the mobile client device to the wireless access point via a second network being a Short Range radio communication network or a Metropolitan Area System radio communication network; transmitting an authentication response from the wireless access point to the mobile client device via the second network upon receiving at least one of the first authentication request and the second authentication request at the wireless access point, and associating the mobile client device with the wireless access point upon receiving the authentication response at the mobile client device.

11 Claims, 7 Drawing Sheets

(51) Int. Cl.
  *H04W 28/02* (2009.01)
  *H04L 12/28* (2006.01)
  *H04L 29/06* (2006.01)
  *H04W 84/18* (2009.01)

(52) U.S. Cl.
  CPC ............ *H04L 63/18* (2013.01); *H04W 12/06* (2013.01); *H04W 88/08* (2013.01); *H04W 84/18* (2013.01)

(56) References Cited

U.S. PATENT DOCUMENTS

| | | | |
|---|---|---|---|
| 2006/0068788 A1* | 3/2006 | Zivkovic | 455/436 |
| 2006/0187871 A1* | 8/2006 | Jones | H04L 12/14 370/328 |
| 2006/0198348 A1* | 9/2006 | Lin | H04W 88/02 370/338 |
| 2006/0236105 A1* | 10/2006 | Brok et al. | 713/169 |
| 2007/0076656 A1* | 4/2007 | Tang | H04W 48/08 370/329 |
| 2009/0042536 A1 | 2/2009 | Bernard et al. | |
| 2009/0046682 A1* | 2/2009 | Kim et al. | 370/338 |
| 2009/0161627 A1* | 6/2009 | Ekambaram et al. | 370/331 |
| 2009/0217048 A1* | 8/2009 | Smith | 713/176 |
| 2009/0219902 A1* | 9/2009 | Aoyama | 370/338 |
| 2009/0239543 A1* | 9/2009 | Kozu | 455/445 |
| 2009/0318124 A1 | 12/2009 | Haughn | |
| 2011/0081890 A1* | 4/2011 | Ahmadvand et al. | 455/411 |
| 2011/0222486 A1* | 9/2011 | Hart | 370/329 |
| 2011/0222523 A1* | 9/2011 | Fu et al. | 370/338 |
| 2012/0005731 A1* | 1/2012 | Lei et al. | 726/6 |
| 2014/0077994 A1* | 3/2014 | Hansen | G01S 1/02 342/367 |

OTHER PUBLICATIONS

Bridgewater Systems, Sharing the Load: The Value of Subscriber, Service and Policy Control in Mobile Data Traffic Offload, 1 (May 2011), http://www.bridgewatersystems.com/Data-Offload.

Balasubramanian, et al., Augmenting Mobile 3G Using WiFi, Microsoft (2010), http://research.microsoft.com/en-us/events/mcs2010/ratul.

Ghosal, Mobile Data Offload Can Wi-Fi Deliver?, IntelliNet Technologies 1 (Jan. 2010), http://www.intellinet-tech.com/Media/PagePDF/Mobile%20Data%20Offload%20-%20Can%20Wi-Fi%20Deliver.

* cited by examiner

METHOD AND DEVICE FOR MOBILE DATA OFFLOAD

CROSS-REFERENCE TO RELATED APPLICATIONS

The present application claims the benefit of the Singapore patent application 201100315-9 filed on 17 Jan. 2011, the entire contents of which are incorporated herein by reference for all purposes.

TECHNICAL FIELD

Embodiments relate generally to mobile data offload from one network to another. Specifically, embodiments relate to mobile data offload from a Cellular Wide Area radio communication network to another network including a Short Range radio communication network or a Metropolitan Area System radio communication network.

BACKGROUND

The mobile data industry is evolving rapidly, resulting in exponential growth in demand for bandwidth. Service providers have foreseen an increasing data growth over the next few years. The growth in mobile data usage is being fueled by growing 3G penetration, popularity of smartphones and USB dongles, advanced mobile applications and flat-rate data plans. As a result, service providers are facing congested networks which are impacting their service delivery levels.

Many service providers are beginning to adopt a range of strategies, such as optimization of 3G networks using intelligent policy control, mobile data traffic offload, and transformation to 4G to reduce costs and alleviate congestion.

Mobile data offload, in particular 3G-WiFi offload, is becoming more and more popular these days. Offload is the ability to move mobile data traffic from one network to another in a way that is transparent to the subscriber, which is a key component of an effective network congestion reduction strategy. Mobile data offload will reduce costs and improve economies of scale by balancing traffic requirements across networks. The cost savings are significant. Service providers deploying a multi-access offload strategy can expect savings in the range of 20 to 25 percent per annum.

For example, AT&T has been in the forefront of using 3G-WiFi offload. AT&T hotspots automatically detect their subscribers and move their data traffic to WiFi. The whole process is completely transparent to the subscribers and the subscribers do not notice any difference.

Mobile data offload from 3G to WiFi presents a number of challenges to service providers. First, service providers must ensure that subscribers receive a consistent and comparable user experience regardless of access network, wherein service portability and continuity across multiple access networks is essential. Second, transparent sign-on is preferred, in which a single sign-on process is required to ensure seamless usage of various networks. Third, authentication access in non-3GPP networks, such as WiFi may not be easy when subscriber authentication data resides in the Home Location Register (HLR) in 3GPP networks. Fourth, smartphone users do not always have WiFi turned on due to the heavy battery drain on their handsets and network systems cannot force a device to switch on WiFi, which present challenges for service providers who want to offload traffic to WiFi. Fifth, the handset's connection manager requires knowledge of WiFi hotspot locations, in particular those in the vicinity of high-traffic cell sites that typically experience congestion. An offload solution also needs to be subscriber-aware, including subscriber location as it relates to available hotspots. Sixth, Simultaneous operation of WiFi and 3G is required, but not all handset manufacturers allow both 3G and WiFi to operate at the same time. In some cases, this can work but under a restricted condition where the WiFi acts as an Access Point (AP). Seventh, WiFi range is short, mainly due to the power of the WiFi transceiver on the handset. In most cases the link would be highly asymmetric, wherein the transmission from the access point would be able to reach the handset but the transmission from the handset is unable to reach the AP. This restricts the offload to happen when the user is static or very near to an AP. Eighth, there might be limited access to WiFi network. In most cases, there will be many WiFi networks in the vicinity of the user but it would be difficult to capitalize on these WiFi APs to provide 3G offload due to the lack of permission and necessary software to enable the switching.

Figure 1:
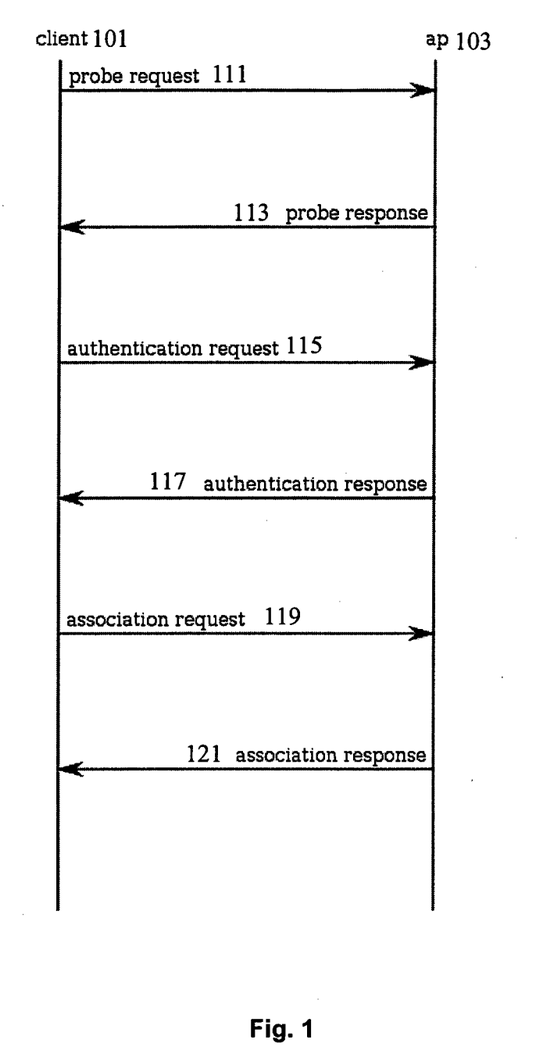
FIG. 1 illustrates the standard protocol exchange between a mobile client and an AP in order for the mobile client to join a WiFi network.

FIG. 1 illustrates the standard protocol exchange between a mobile client and an AP in order for the mobile client to join a WiFi network.

As shown in FIG. 1, when the mobile client 101 tries to associate with the AP 103, it sends a probe request 111 to the AP 103. The AP 103, upon receiving the probe request 111, sends back a probe response 113 to the mobile client 101. The mobile client 101 then sends an authentication request 115 to the AP 103. The AP 103, upon receiving the authentication request 115, sends back an authentication response 117 to the mobile client 101. After authentication process, the mobile client 101 sends an association request 119 to the AP 103. The AP 103, upon receiving the association request 119, sends back an association response 121 to the mobile client 101. Accordingly, the mobile client 101 is associated with the wireless access point 103, and the mobile data offload from 3G to WiFi is enabled.

In the above process, the probe request 111 and the probe response 113 are invoked depending on the scenario. Normally, probe request is used when the mobile device proactively tries to search for APs to associate with.

In practice, allowable transmission power levels of WiFi usually vary from region to region. For example, according to FCC rules, 4W EIRP for isotropic PMP mode is allowed for US. EIRP levels of 20 dBm are allowed in the EU. Based on these power levels, the range of a WiFi access point operating in the point to multipoint mode can reach a distance of about 1 km. This would make it feasible for mobile network operators to install their own specialized WiFi APs. Long range WiFi nodes can be installed sparsely in the exterior of buildings. With the long range WiFi, the service provider need not depend on the public WiFi APs, which is a nightmare when it comes to controlling quality of service, billing, installation and access management. Long range WiFi would therefore reduce cost and provide larger coverage foot print.

However, power levels in typical mobile client device, such as smartphones, are usually very low, which usually allow radio ranges of up to about 50 m in the uplink. In that case, for example, the requests 111, 115, 119 from the mobile client 101 in FIG. 1 may not be able to reach the AP 103 when the distance between the mobile client 101 and the AP 103 exceeds the uplink radio range, and therefore the 3G-WiFi offload may fail. The disparity in the radio ranges for the uplink and downlink transmission to the mobile client remains a problem.

SUMMARY

Various embodiments provide a mobile data offload method for associating a mobile client device with a wireless access point. The method may include transmitting a first authentication request from the mobile client device to the wireless access point via a first network being a Cellular Wide Area radio communication network; transmitting a second authentication request from the mobile client device to the wireless access point via a second network being a Short Range radio communication network or a Metropolitan Area System radio communication network; transmitting an authentication response from the wireless access point to the mobile client device via the second network upon receiving at least one of the first authentication request and the second authentication request at the wireless access point, and associating the mobile client device with the wireless access point upon receiving the authentication response at the mobile client device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Various embodiments address the unfavorable uplink radio ranges to provide a more reliable offload solution to associate the mobile client with the APs.

Various embodiments provide a more reliable data transmission when mobile data traffic is offloaded to another network, e.g. a Short Range radio communication network or a Metropolitan Area System radio communication network.

Various embodiments provide a reliable mobile data offload method, which also achieves an improved coverage and availability of a Short Range radio communication network or a Metropolitan Area System radio communication network for offloading.

Embodiments described below in context of the mobile data offload method are analogously valid for the respective devices for implementing the offload method, and vice versa.

In this context, the mobile client device, the wireless access point and the offload server as described in this description may include a memory which is for example used in the processing carried out in these devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the mobile client device, the wireless access point and the offload server as described in this description may be or may include one or more circuits configured to perform the respective processing, respectively.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

One embodiment is directed to a mobile data offload method for associating a mobile client device with a wireless access point. The method may include transmitting a first authentication request from the mobile client device to the wireless access point via a first network being a Cellular Wide Area radio communication network; transmitting a second authentication request from the mobile client device to the wireless access point via a second network being a Short Range radio communication network or a Metropolitan Area System radio communication network; transmitting an authentication response from the wireless access point to the mobile client device via the second network upon receiving at least one of the first authentication request and the second authentication request at the wireless access point, and associating the mobile client device with the wireless access point upon receiving the authentication response at the mobile client device.

In an embodiment, transmitting the first authentication request via the first network may include transmitting the first authentication request from the mobile client device to an offload server via the first network; and transmitting the first authentication request from the offload server to the wireless access point via the first network.

According to an embodiment, the sequence of transmitting the first authentication request and transmitting the second authentication request may be interchangeable.

In one embodiment, associating the mobile client device with the wireless access point may include, upon receiving the authentication response at the mobile client, transmitting a first association request from the mobile client device to the wireless access point via the first network and transmitting a second association request from the mobile client device to the wireless access point via the second network. Associating the mobile client device with the wireless access point may further include, upon receiving at least one of the first association request and the second association request at the wireless access point, transmitting an association response from the wireless access point to the mobile client via the second network.

According to an embodiment, transmitting the first association request via the first network may include transmitting the first association request from the mobile client device to an offload server via the first network; and transmitting the first association request from the offload server to the wireless access point via the first network.

The sequence of transmitting the first association request and transmitting the second association request may be interchangeable.

In another embodiment, after transmitting the authentication response from the wireless access point for a predetermined time period, one or more association responses are transmitted continuously from the wireless access point to the mobile client via the first network. An association request is transmitted from the mobile client device to the wireless access point. It is determined whether the mobile client device receives the one or more association responses after the transmission of the association request; and if it is determined that the mobile client device receives the one or more association responses after the transmission of the association request, the mobile client device is associated with the wireless access point.

According to an embodiment, before transmitting the first authentication request and the second authentication request from the mobile client device, the method may further include transmitting a first probe request from the mobile client device to the wireless access point via the first network; transmitting a second probe request from the mobile client device to the wireless access point via the second network; and transmitting a probe response from the wireless access point to the mobile client via the second network upon receiving at least one of the first probe request and the second probe request at the wireless access point.

In an embodiment, transmitting the first probe request via the first network may include transmitting the first probe request from the mobile client device to an offload server via the first network; and transmitting the first probe request from the offload server to the wireless access point via the first network.

The Cellular Wide Area radio communication network in this description may include but is not limited to a communication network based on one of the following technologies, e.g. a Global System for Mobile Communications (GSM) radio communication technology, a General Packet Radio Service (GPRS) radio communication technology, an Enhanced Data Rates for GSM Evolution (EDGE) radio communication technology, a Third Generation Partnership Project (3GPP) radio communication technology (e.g. UMTS (Universal Mobile Telecommunications System) (e.g., W-CDMA (Wideband Code Division Multiple Access)), FOMA (Freedom of Multimedia Access), 3GPP LTE (Long Term Evolution), 3GPP LTE Advance (Long Term Evolution Advance)), and/or a Fourth Generation (4G) radio communication technology.

The Short Range radio communication network in this description may include but is not limited to one of the following communication networks, e.g. Wireless Local Area Network (LAN) radio communication (e.g. according to an IEEE 802.11 (e.g. IEEE 802.11n) radio communication standard, e.g. WiFi), Bluetooth radio communication.

The Metropolitan Area System radio communication network in this description may include but is not limited to one of the following communication network, e.g. wireless Metropolitan Area Network (MAN) radio communication, Worldwide Interoperability for Microwave Access (WiMax) (e.g. according to an IEEE 802.16 radio communication standard), Wireless Broadband (WiBro).

Another embodiment is directed to a mobile client device for carrying out the offload method described in the above embodiments. The mobile client device may include a first interface providing access to a first network being a Cellular Wide Area radio communication network; a second interface providing access to a second network being a Short Range radio communication network or a Metropolitan Area System radio communication network; and a transceiver. The transceiver is configured to transmit one or more probe requests, authentication requests and/or association requests to a wireless access point through the first interface via the first network and to transmit the one or more requests to the wireless access point throught the second interface via the second network, respectively, and the transceiver is configured to receive responses from the wireless access point through the second interface via the second network.

In one embodiment, the mobile client device may further include a determining circuit configured to determine whether the mobile client device receives an association response after the transmission of the association request according to the method described above.

Another embodiment is directed to an offload server carrying out the offload method described in the above embodiments. The offload server may include a transceiver configured to receive a probe request, an authentication request and/or an association request from a mobile client device via a Cellular Wide Area radio communication network; and to transmit the received probe request, the received authentication request and/or the received association request to a wireless access point via the Cellular Wide Area radio communication network.

A further embodiment is directed to a wireless access point carrying out the offload method described in the above embodiments.

The wireless access point may include a plurality of wireless transceivers. The wireless transceivers are configured to receive one or more probe requests, authentication requests and/or association requests from an offload server via a first network and/or from a mobile client device via a second network, and the wireless transceivers are configured to transmit a probe response, an authentication response and/or an association response to the mobile client device via the second network. The first network may be a Cellular Wide Area radio communication network, and the second network may be a Short Range radio communication network or a Metropolitan Area System radio communication network.

In an embodiment, the wireless access point is a long range WiFi access point providing a radio range of more than 100 m. Examples of the radio ranges may include 100 m, 200 m, 500 m, 800 m, etc. In another embodiment, the wireless access point is a long range WiFi access point providing a radio range of more than 1 km. Depending on the power limits, and if regulators allow more power, the wireless access point may provide an even longer radio range, e.g. beyond 1 km, 2 km, 5 km, 10 km, 50 km, etc. in other embodiments.

In one embodiment, the wireless access point may include a virtual wireless transceiver configured to route the probe requests, authentication requests and/or association requests to a desired wireless transceiver determined out of the plurality of wireless transceivers.

In another embodiment, the wireless access point may include a driver configured to route the probe requests, authentication requests and/or association requests to a desired wireless transceiver determined out of the plurality of wireless transceivers.

In the above embodiments, the desired wireless transceiver may be determined based on the location of mobile client device.

Another embodiment is directed to a mobile data offload method. The method may include transmitting uplink data from a mobile client device via a first network being a Cellular Wide Area radio communication network, and transmitting downlink data to the mobile client device via a second network being a Short Range radio communication network or a Metropolitan Area System radio communication network.

In an embodiment, the method further include initiating the transmission of downlink data from a wireless access point to the mobile client device using a two-way handshake or a four-way handshake.

In one embodiment, the method may include transmitting a data packet from the wireless access point to the mobile client device via the second network, and faking an ACK packet at the wireless access point as if the ACK packet originates from the mobile client device. The facked ACK packet is sent to a desired wireless transceiver of the wireless access point.

In another embodiment, the method may further include, before transmitting the data packet, transmitting a RTS (Ready to send) message from the wireless access point to the mobile client device via the second network. A CTS (Clear to send) message is faked at the wireless access point as if the CTS message originates from the mobile client device; and the faked CTS message is sent to a desired wireless transceiver of the wireless access point.

According to an embodiment, the method may further include intercepting transmission of a data response packet from the mobile client device to the wireless access point via the second network, upon receiving the data packet at the mobile client device. The data response packet is then transmitted from the mobile client device to the wireless access point via the first network.

According to another embodiment, the method may include intercepting, at the mobile client device, the transmission of the uplink data via the second network.

In an embodiment, transmitting the data response packet or the uplink data via the first network may include tunneling the data response packet or the uplink data to the wireless access point using a tunneling protocol.

Another embodiment is directed to a mobile client device. The mobile client device may include a first interface providing access to a first network being a Cellular Wide Area radio communication network; a second interface providing access to a second network being a Short Range radio communication network or a Metropolitan Area System radio communication network; and a transceiver. The transceiver is configured to transmit uplink data to the wireless access point through the first interface via the first network, and to receive downlink data from the wireless access point through the second interface via the second network. The mobile client device may further include an interception circuit configured to intercept uplink data to be transmitted to the wireless access point via the second network.

A further embodiment is directed to a wireless access point, including a plurality of wireless transceivers configured to transmit downlink data to a mobile client device via a Short Range radio communication network or a Metropolitan Area System radio communication network. The wireless access point may further include a virtual wireless transceiver configured to fake one or more packets as if the packets originate from the mobile client device, and to send the faked packets to a desired wireless transceiver determined out of the plurality of wireless transceivers.

Another embodiment is directed to a wireless access point, including a plurality of wireless transceivers configured to transmit downlink data to a mobile client device via a Short Range radio communication network or a Metropolitan Area System radio communication network. The wireless access point may further include a driver configured to fake one or more packets as if the packets originate from the mobile client device, and to send the faked packets to a desired wireless transceiver determined out of the plurality of wireless transceivers.

Figure 2:
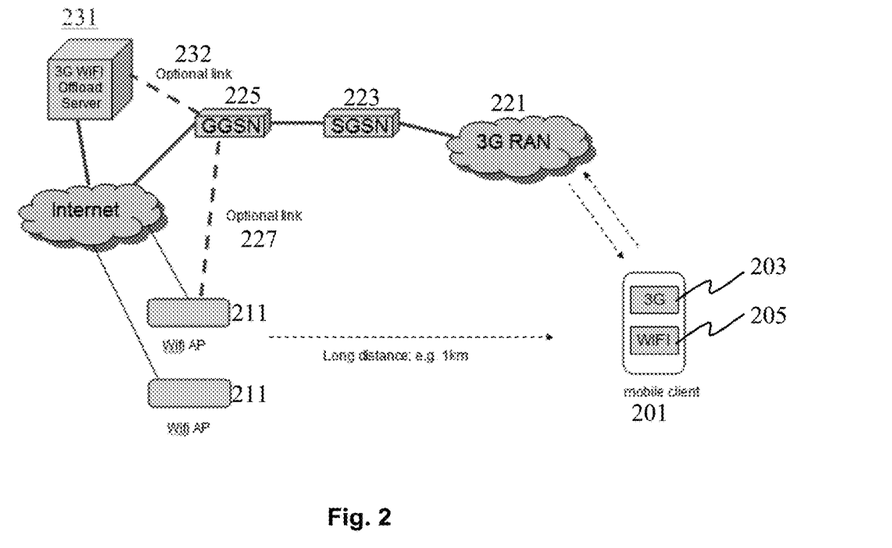
FIG. 2 shows a network architecture for mobile data offload in accordance with various embodiments.

FIG. 2 shows a network architecture for mobile data offload in accordance with various embodiments.

The mobile data offload from a first network to a second network in accordance with various embodiments is provided.

The first network may be a Cellular Wide Area radio communication network. As described above, the Cellular Wide Area radio communication network may include but is not limited to communication networks based on the following technology, e.g. GSM, GPRS, EDGE, 3GPP radio communication technology (e.g. UMTS (e.g. W-CDMA), FOMA, 3GPP LTE, 3GPP LTE Advance), and/or 4G.

The second network may be a Short Range radio communication network or a Metropolitan Area System radio communication network.

As described above, the Short Range radio communication network may include but is not limited to the following communication networks, e.g. Wireless LAN (e.g. according to an IEEE 802.11 (e.g. IEEE 802.11n) radio communication standard, e.g. WiFi), Bluetooth.

As described above, the Metropolitan Area System radio communication network may include but is not limited to the following communication networks, e.g. wireless MAN, WiMax, WiBro.

In this example, the mobile data offload is described in the context of 3G-WiFi offload. However, it is to be noted that the mobile data offload of various embodiments can be applied for offload from other types of Cellular Wide Area radio communication network to other types of Short Range radio communication network or Metropolitan Area System radio communication network.

A mobile client 201 may include two or more interfaces for network access. In an embodiment, the mobile client 201 includes a first interface, e.g. a 3G interface 203, enabling access to a Cellular Wide Area radio communication network, e.g. a 3G network. The mobile client 201 further includes a second interface providing access to a Short Range radio communication network or a Metropolitan Area System radio communication network, such as Wireless LAN or Wireless MAN. In this embodiment, the second interface is a WiFi (also referred to as 802.11a/b/g/n) interface 205. Examples of the mobile client device 201 include but are not limited to handphones, smartphones, tablet computers, PDA and handheld game consoles.

In FIG. 2, the mobile client device 201 connects to the 3G network in a standard manner via the 3G RAN (Radio Access Network) 221. The mobile client device 201 connects to a desired WiFi AP 211 selected out of a plurality of WiFi APs through its WiFi interface 205 using the standard point-to-multipoint protocol. In the example of FIG. 2, the distance between the mobile device 201 and the WiFi AP 211 is depicted as 1 km, in which the WiFi AP 211 is a long range WiFi AP. However, any communication link distance shorter than 1 km is also possible in other embodiments. When the distance between the mobile client device 201 and the WiFi AP 211 is long, the mobile client 201 may receive downlink packets/frames from the WiFi AP 211, but the uplink transmission to the WiFi AP 211 may not be successful due to the RF power level of the mobile client 201 using the conventional offload method, as discussed above. In an embodiment, the WiFi AP 211 is provided with extra features to handle the asymmetrical WiFi uplink and downlink communication, as will be described in detail below.

In FIG. 2, a SGSN (Serving GPRS Support Node) 223 is provided between the 3G RAN 221 and a GGSN (Gateway GPRS Support Node) 225 for delivery of data packets from and to the mobile client device 201. The GGSN 225 is connected to the WiFi AP 211 via the Internet. The GGSN 225 may also be connected directly to the Wireless APs 211 through an optional link 227 as shown in FIG. 2.

A 3G-WiFi offload server 231 is also provided, which may be located on the Internet or located in the 3G network being connected with the GGSN 225 through an optional link 232. The 3G-WiFi offload server 231 is configured to aid in the coordination of the uplink and downlink communication between the WiFi AP 211 and the mobile client 201. In an embodiment, the 3G-WiFi offload server 231 may be co-located with the distributed long range WiFi APs 211.

The mobile data offload method between a Cellular Wide Area radio communication network and another network including a Short Range radio communication network or a Metropolitan Area System radio communication network in accordance with various embodiments as described below is implemented in the architecture of FIG. 2.

Figure 3:
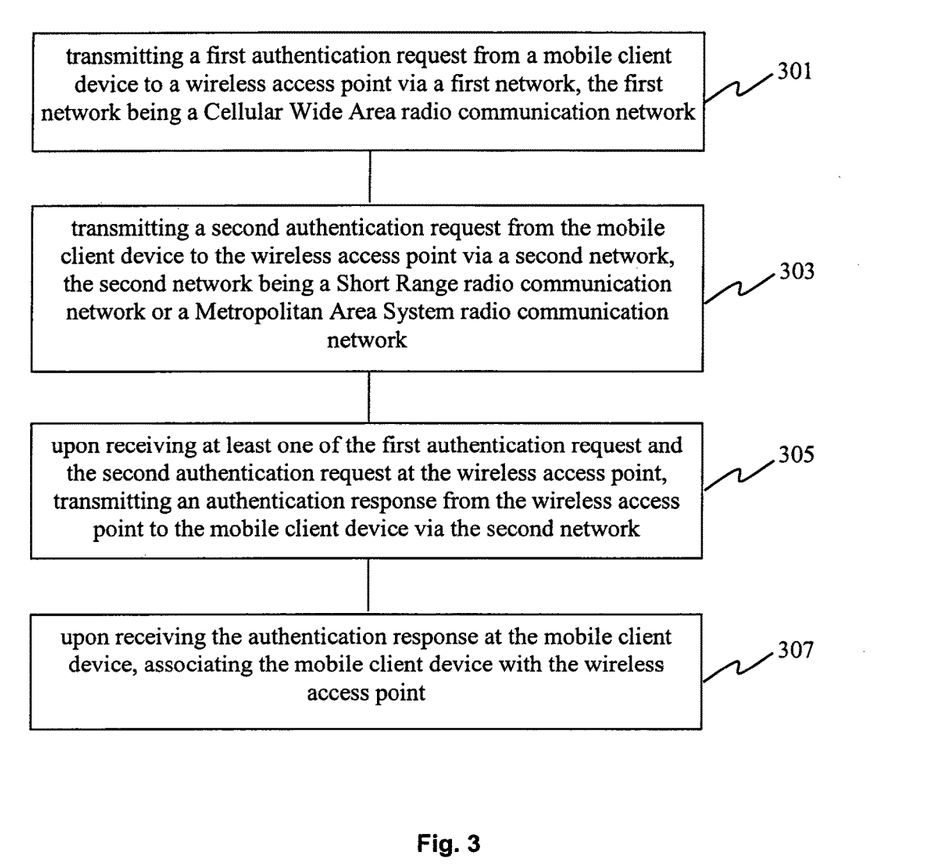
FIG. 3 shows a flowchart illustrating a mobile data offload method for associating a mobile client device with a wireless access point according to an embodiment.

FIG. 3 shows a flowchart illustrating a mobile data offload method for associating a mobile client device with a wireless access point according to an embodiment.

At 301, a first authentication request is transmitted from the mobile client device to the wireless access point via a first network, wherein the first network is a Cellular Wide Area radio communication network. In an embodiment, transmitting the first authentication request via the first network may include transmitting the first authentication request from the mobile client device to an offload server via the first network, and transmitting the first authentication request from the offload server to the wireless access point via the first network.

At 303, a second authentication request is transmitted from the mobile client device to the wireless access point via a second network, wherein the second network is a Short Range radio communication network or a Metropolitan Area System radio communication network.

At 305, an authentication response is transmitted from the wireless access point to the mobile client device via the second network, upon receiving at least one of the first authentication request and the second authentication request at the wireless access point.

At 307, the mobile client device is associated with the wireless access point, upon receiving the authentication response at the mobile client device.

The sequence of transmitting the first authentication request at 301 and transmitting the second authentication request at 303 may be interchangeable according to an embodiment.

In one embodiment, associating the mobile client device with the wireless access point at 307 may include transmitting a first association request from the mobile client device to the wireless access point via the first network and transmitting a second association request from the mobile client device to the wireless access point via the second network, upon receiving the authentication response at the mobile client. Upon receiving at least one of the first association request and the second association request at the wireless access point, an association response is transmitted from the wireless access point to the mobile client via the second network.

In another embodiment, associating the mobile client device with the wireless access point at 307 may be based on an estimation of the time when the mobile client needs to initiate the association session. After transmitting the authentication response from the wireless access point at 305 for a predetermined time period, one or more association responses is transmitted continuously from the wireless access point to the mobile client via the second network. An association request is transmitted from the mobile client device to the wireless access point. It is then determined whether the mobile client device receives the one or more association responses after the transmission of the association request; and if it is determined that the mobile client device receives the one or more association responses after the transmission of the association request, the mobile client device is associated with the wireless access point.

In a further embodiment, before transmitting the first authentication request at 301 and transmitting the second authentication request at 303 from the mobile client device, a Probe session may be initiated between the mobile client device and the wireless access point. In an embodiment, a first probe request is transmitted from the mobile client device to the wireless access point via the first network, and a second probe request is transmitted from the mobile client device to the wireless access point via the second network. Upon receiving at least one of the first probe request and the second probe request at the wireless access point, a probe response is transmitted from the wireless access point to the mobile client via the second network, indicating that the mobile client device and the wireless access point may proceed with the authentication session.

Figure 4:
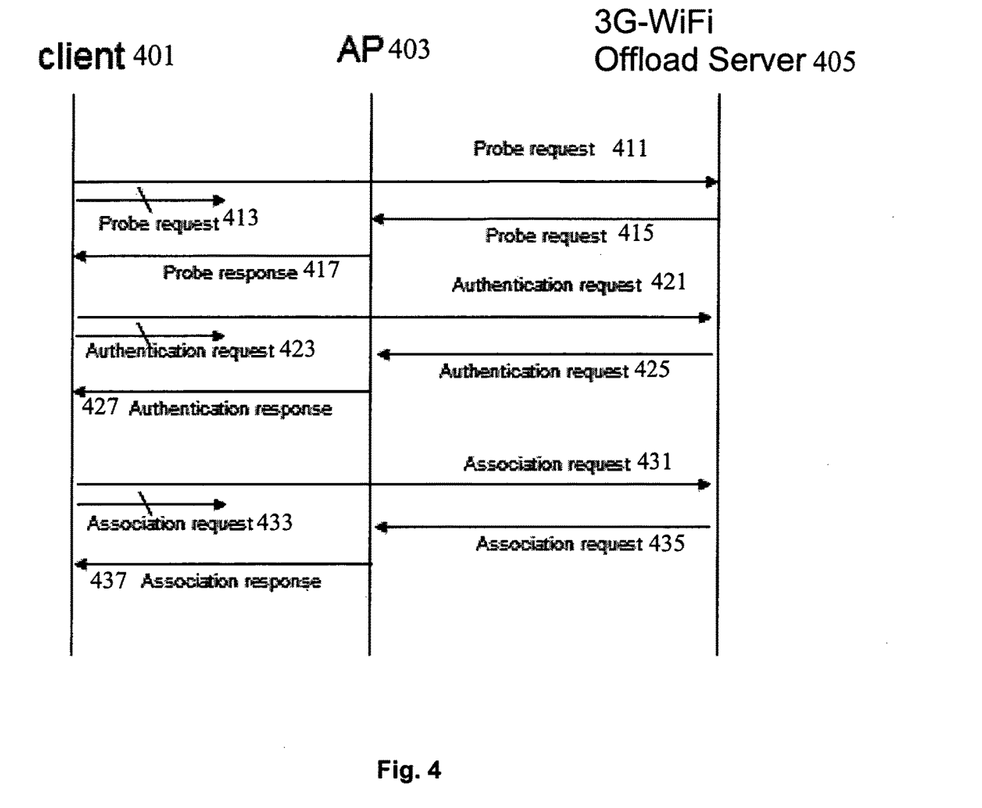
FIG. 4 illustrates a mobile data offload method for associating a mobile client device with a wireless access point according to another embodiment.

FIG. 4 illustrates a mobile data offload method for associating a mobile client device with a wireless access point according to another embodiment.

When a mobile client 401 wants to offload the data to WiFi, it sends a first probe request in a message 411 to a 3G-WiFi offload server 405 via the 3G network. The first probe request is processed by the 3G-WiFi offload server 405 which may reside in the 3G network or outside the 3G network. The first probe request may include information about the location of the mobile client 401. The location of the mobile client 401 may be obtained in several ways, including 3G base station triangulation, GPS, etc. In an alternative embodiment, instead of being coded and carried in the probe request message 411, the location of the mobile client 401 may be requested by the 3G-WiFi offload server 405 from the 3G network. Location information of the mobile client 401 is essential in deciding which AP or which transceiver at the AP should be used to service the client. The location information will be sent to the AP 405 so that the AP 405 will be able to decide which transceiver at the AP is to be used.

The mobile client 401 may also send a second probe request in a message 413 to a wireless AP 403 through the WiFi interface on the mobile client 401.

Depending on the configuration (e.g. the software configuration) of the mobile client device 401, the sequence of sending the first probe request and the second probe request are interchangeable. In an embodiment, the mobile client device 401 is provided with a software module which actively sniffs for the messages, e.g. the message 413 including the second probe request, that are being sent out through the WiFi interface of the mobile client device 401. Once the probe request message 413 has been sent out, the software module on the mobile client device 401 may then initiate the transmission of the first probe request message 411 to the 3G network after the transmission of the second probe request message 413. The second probe request message 413 in FIG. 4 is depicted with a short and slashed arrow, indicating that the message 413 might not reach the AP via the uplink wireless link due to the short radio ranges in the uplink.

After receiving the first probe request message 411, the 3G-WiFi offload server 405 sends the first probe request in a message 415 to the AP 403. When the AP 403 receives the message 415 via the 3G network, the AP 403 channels the message 415 to a specific WiFi transceiver desired to serve the mobile client 401. The desired WiFi transceiver is determined based on the location of the mobile client device 401, wherein the location information may be included in the message 415.

The message 415 may be routed to a desired WiFi transceiver at the AP 403. The AP 403 may include a plurality of transceivers to cater for coverage in different directions. In an embodiment, a WiFi transceiver with its antenna pointing to the mobile client 401 is determined to be a desired WiFi transceiver and will be selected for use. In one embodiment, the AP 403 may include a virtual transceiver configured to route the message 415 directly to the intended WiFi transceiver via the radio link. In another embodiment, the AP 403 may include an internal device driver configured to route the message 415 to the intended WiFi transceiver. When the WiFi transceiver of the AP 403 receives either one of the second probe request 413 or the probe request message 415, it may generate and send a probe response in a message 417 to the mobile client 401. The probe response message 417 will reach the mobile client 401 via the long distance link.

After the probe response message 417 is received by the mobile client 401, the mobile client 401 may send a first authentication request in a message 421 to the 3G-WiFi offload server 405 via the 3G network. Similar to the probe request, the mobile client 401 may be configured to sniff the activity on the WiFi interface and wait for the WiFi device to send out a second authentication request in a message 423 via the WiFi network before initiating the transmission of message 421, according to an embodiment. In another embodiment, the mobile client 401 may initiate the transmission of message 421 before the transmission of message 423, if the mobile client 401 has a better control of the WiFi management exchange. The second authentication request message 423 is depicted with a short and slashed arrow, indicating that the message 423 might not reach the AP via the uplink wireless link due to the short radio ranges in the uplink.

When the first authentication message 421 is received by the 3G-WiFi offload server 405, it may be routed to the AP 403 in a message 425. In one embodiment, the AP 403 may include a virtual transceiver which acts on behalf of the mobile client 401 to fake the authentication request via the radio interface. In another embodiment, the AP 403 may include a software module, e.g. an internal driver, to directly send the authentication request to the appropriate WiFi transceiver via the networking stack. Upon receiving the authentication request, the WiFi transceiver of the AP 403 transmits an authentication response in a message 427 to the mobile client 401 via the long distance link.

Once authentication is done, the association process may be carried out to associate the mobile client 401 with the AP 403. Similar to the above Probe and Authentication sessions, the mobile client 401 may send a first association request in a message 431 to the offload server 405 via the 3G network, and send a second association request in a message 433 to the AP 403 via the WiFi network. In one embodiment, the message 431 may be transmitted before the message 433. In another embodiment, the mobile client 401 may be configured to sniff the activity of the WiFi interface and wait for the transmission of the association request message 433 before transmitting the message 431. The second association request message 433 is depicted with a short and slashed arrow, indicating that the message 433 might not reach the AP via the uplink wireless link due to the short radio ranges in the uplink.

The offload server 405 forwards the received first association request in a message 435 to the AP 403. In one embodiment, the AP 403 may include a virtual transceiver configured to forward the association request message 433 or 435 to the desired WiFi transceiver. In another embodiment, the association request message 433 or 435 may be sent directly to the WiFi device driver via the networking stack. An association response in a message 437 is finally sent to the mobile client 401 to associate the mobile client device 401 with the AP 403. Once the mobile client device 401 is associated with the AP 403, it is ready to receive data via the WiFi network.

In an embodiment, the three message exchanges, including probe request—probe response, authentication request—authentication response and association request—association response above, may have their associated timers. In an exemplary implementation, the timers may be set to 5 seconds. It is essential for the round trip request—response for these three pairs of message exchange to meet the timing requirement. If the timing is not met, the message exchanges may be retried.

In the above embodiments, the mobile client device 401 may have to depend a lot on the packet sniffing approach. In another embodiment, an alternative approach based on timing the response of the messages from the AP 405 at the appropriate time is provided. For example, it is assumed that the user or a client software at the mobile client device 401 is able to initiate the authentication process. Once the mobile client 401 sends out the authentication message 423 through WiFi, the client device 401 may also send the authentication message 421 via 3G to the AP 403. The AP 403 may then respond with the authentication response message 427 via WiFi. The AP 403 may anticipate the sending of the association messages 421, 423 from the mobile client 401. This is carried out by estimating the time that the client 401 needs to initiate the association request after receiving the authentication response message 427. The AP 403 may then send one or several association response messages 437 continuously to help the client 401 associate. If the client 401 receives association response messages 437 after the association request messages 421, 423 have been sent out, the mobile client 401 may be associated with the AP 403. If the association response message 427 is received before the association request messages 421, 423 are sent out, the mobile client 401 may receive a response message indicating failure of the association process. When the overall association process fails, the entire process starting from authentication or association may be repeated.

In the above embodiments, the WiFi AP 403 may be a long range WiFi AP with a radio range of more than 100 m. For example, the WiFi AP 403 may provide a radio range of 100 m, 200 m, 500 m, or 800 m, etc. In other examples, the WiFi AP 403 may provide a longer radio range, e.g. beyond 1 km, 2 km, 5 km, 10 km, 50 km, etc. depending on the power limits in other embodiments.

In accordance with the embodiments, the request messages 411, 421, 431 in the uplink are transmitted via the 3G network. Compared with conventional offload method to transmit the association request via the WiFi in which the association request may not reach the WiFi successfully, the embodiments improves the uplink transmission at a long distance from the WiFi AP and ensures a reliable offload process to associate the mobile client with the WiFi AP.

In the above embodiments described with reference to FIG. 4, the message exchange between the mobile client and the AP is described in the case wherein three management protocol exchanges of Probe, Authentication and Association are included. It is understandable that protocol exchanges of only Authentication and Association may be used in another embodiment, for example, when the mobile client is not proactively searching for APs to associate with. In other embodiments, it is also possible that the protocol exchanges of Association message is used, for example, when the mobile client has been authenticated to the AP in another way.

After the mobile client is associated with the AP according to the embodiments above, the data transmission may be offloaded to the Short Range radio communication network or the Metropolitan Area System radio communication network.

Figure 5:
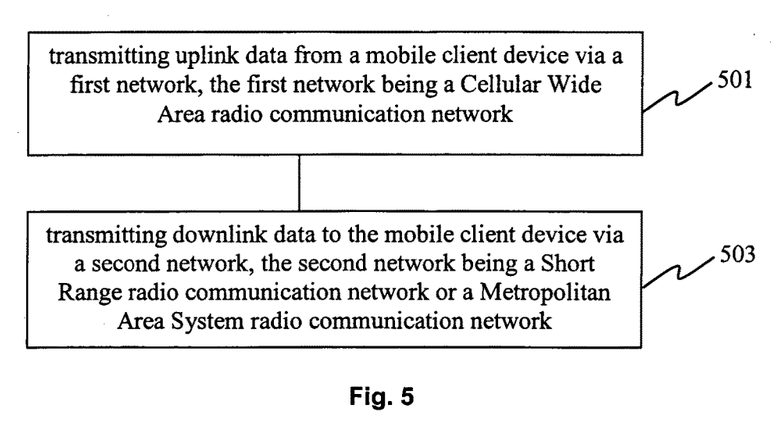
FIG. 5 shows a flowchart illustrating a mobile data offload method for data transmission between a mobile client device and a wireless access point according to an embodiment.

FIG. 5 shows a flowchart illustrating a mobile data offload method for data transmission between a mobile client device and a wireless access point according to an embodiment.

At 501, uplink data is transmitted from a mobile client device via a first network, e.g. to a wireless AP. The first network is a Cellular Wide Area radio communication network.

At 503, downlink data is transmitted from the wireless AP to the mobile client device via a second network, wherein the second network is a Short Range radio communication network or a Metropolitan Area System radio communication network.

In accordance with the above embodiment, only downlink data transmission is offloaded to the second network, e.g. WiFi, since the downlink data transmission from the wireless AP is usually stable and reliable even when the mobile client device is at a long distance from a long range wireless AP. The uplink data transmission is still performed via the Cellular Wide Area radio communication network, which avoids unreliable uplink transmission via the second network due to the short radio range of the mobile client device in the uplink. According to the above embodiment, the uplink and downlink traffic between 3G and WiFi network is split, wherein the use of the 3G network is critical and mainly used for uplink data transfer as well as critical control messages. In addition, the justification for higher service charges from the MNC's view is stronger especially if the 3G network and the long range infrastructure WiFi owned/managed by the MNC is used.

In an embodiment, the transmission of downlink data from the wireless access point to the mobile client device at 503 is initiated using a two-way handshake or a four-way handshake.

In an embodiment wherein the two-way handshake is used, the transmission of downlink data may include transmitting a data packet from the wireless access point to the mobile client device via the second network. At the wireless access point, an ACK packet may be faked as if the ACK packet originates from the mobile client device. The faked ACK packet is then sent to a desired wireless transceiver of the wireless access point.

In another embodiment wherein the four-way handshake is used, a RTS (Ready to send) message may be transmitted from the wireless access point to the mobile client device via the second network, before the transmission of the data packet as described above. A CTS (Clear to send) message is faked at the wireless access point as if the CTS message originates from the mobile client device. The faked CTS message is then sent to a desired wireless transceiver of the wireless access point.

In the embodiments using two-way handshake or four-way handshake, upon receiving the data packet at the mobile client device, the transmission of a data response packet from the mobile client device to the wireless access point via the second network may be intercepted. The data response packet is instead transmitted from the mobile client device to the wireless access point via the Cellular Wide Area radio communication network. In an embodiment, transmitting the data response packet via the Cellular Wide Area radio communication network may include tunneling the data response packet to the wireless access point using a tunneling protocol. The process of interception and re-transmission via the Cellular Wide Area radio communication network may also be similarly applied to the transmission of uplink data.

Figure 6:
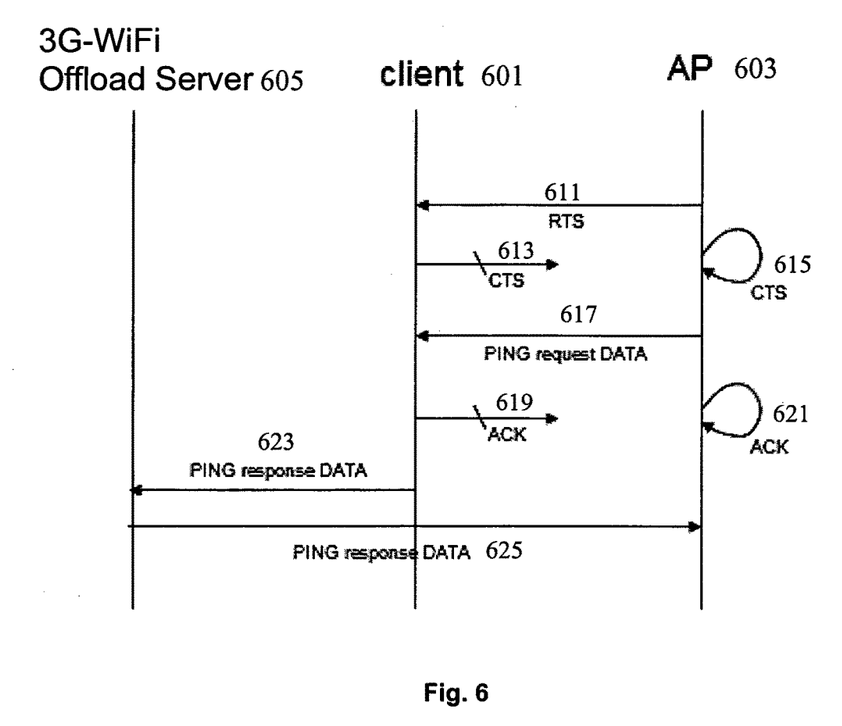
FIG. 6 illustrates a mobile data offload method for data transmission between a mobile client device and a wireless access point according to another embodiment.

FIG. 6 illustrates a mobile data offload method for data transmission between a mobile client device and a wireless access point according to another embodiment.

For illustration purposes, the first network is selected as the 3G network and the second network is selected as the WiFi network. It is understandable that other types of Cellular Wide Area radio communication network and Short Range radio communication networks or Metropolitan Area System radio communication networks may be used in other embodiments.

Data exchange in WiFi or 802.11 is normally based on a four-way handshake or a two-way handshake. According to an embodiment, the data exchange between the mobile client 601 and the WiFi AP 603 is asymmetrical when the mobile client 601 and the AP 603 are far apart from each other. In accordance with an embodiment, the uplink data is transmitted via 3G interface, while the downlink data is transmitted via WiFi interface.

In the following example, the networking "Ping" utility is used to illustrate the data exchange. When the AP 603 pings the client 601, it will send a ping request to the client 601. In the embodiment of FIG. 6, the AP 603 initiates a 4 way handshake and sends an RTS (Ready to send) message 611 to the mobile client 601 at the link layer.

The mobile client device 603 may reply with a CTS (Clear to send) message 613 via the WiFi. However, the CTS message 613 may not arrive at the AP 603 due to the long distance between the client 601 and the AP 603. In an embodiment, the AP 603 may include a virtual WiFi interface, also referred to as a virtual transceiver, used to send a CTS message 615 to the intended WiFi interface at the AP 603. The MAC address of the virtual interface may be configurable and mimics the MAC address of the client 601, such that the CTS message 615 is a faked CTS message as if originating from the client 601. The intended WiFi transceiver of the AP 603 is then be fooled to believe that the CTS message 615 has been sent by the client 601.

The AP 603 then sends out the Ping request data message 617 to the client 617 via WiFi. The client 601 receives the Ping request data message 617 and processes the message 617 accordingly. The client 601 may send an ACK message 619 to the AP 603 via WiFi, which ACK message 619 may not reach the AP 603 due to the distance between the client 601 and the AP 603. On the AP 603, the virtual transceiver may mimic the ACK message 619 and send the faked ACK message 621 to the intended WiFi transceiver at the AP 603.

In the uplink direction, the response message 623 of the ping packet is intercepted by the mobile client 601 (e.g. by a software module of the mobile client) at the networking layer before it can be sent to the WiFi interface of the mobile client 601. The Ping response packet 623 is sent via the 3G interface of the mobile 601 to the AP 603. In an embodiment, the Ping response message 623 is transmitted to a 3G-WiFi offload server 605 via the 3G network, and the offload server 605 transmits the Ping response packet in a message 625 to the AP 603 via the 3G network. The response message may be tunneled to the intended AP 603 via a tunneling protocol.

The above method may also be used to perform a TCP like session between the mobile client 601 and the AP 603, creating a reliable link between these two devices. Any packet, such as TCP ACK packet, that is destined to the AP in the uplink may be captured by the mobile client 601 (e.g. by a software module of the mobile client) and tunneled via the 3G interface to the AP 603. In this manner, a reliable packet delivery mechanism can be achieved.

In another embodiment, the AP 603 may initiate a 2-way handshake. In an embodiment, the AP 603 may be modified in such a way that an incoming ACK message is faked at the MAC layer of the WiFi interface at the AP 603, without the need to using a virtual driver to fool the transceiver at the AP 603 that a packet originating from the mobile client 601 has been received.

Figure 7:
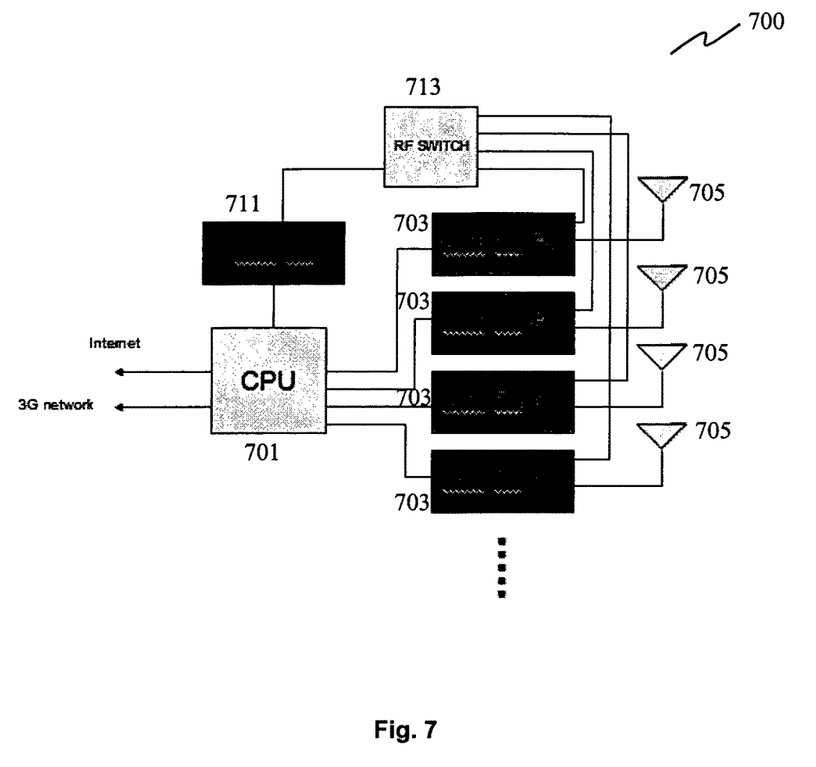
FIG. 7 shows a wireless access point according to an embodiment.

FIG. 7 shows a wireless access point according to an embodiment.

The wireless access point 700 may include a CPU 701, which acts as an addressable device and may include several services to handle the communication between the access point 700 and a mobile client device.

The wireless access point 700 may include a plurality of wireless transceivers, e.g. WiFi transceivers 703, which are connected to a plurality of antennas, respectively. In an example, the WiFi transceivers 703 are connected to sector antennas 705.

In an embodiment, the wireless access point 700 may include an additional WiFi transceiver 711 acting as a virtual transceiver 711 for the distant mobile client. The virtual transceiver 711 may aid in the uplink transmission to carry out various WiFi functions, such as Association, Authentication, Probes, 4-way RTS-CTS-DATA-ACK handshake and 2-way DATA-ACK handshake, as described in various embodiments above. The operation of the virtual transceiver 711 is controlled by the WiFi AP 700, and is coordinated through the protocol exchange between the mobile device and WiFi AP that could go through the 3G network as well as the WiFi network. The virtual transceiver 711 may route RF signal via a bank of RF switch 713 to the multiple WiFi transceivers 703.

In one embodiment, the wireless access point 700 may be used in the mobile data offload method for associating the mobile client device to the access point as described in FIGS. 3 and 4 above.

The plurality of WiFi transceivers 703 may be configured to receive one or more probe requests, authentication requests and/or association requests from an offload server via a first network and/or from a mobile client device via a second network. The first network may be a Cellular Wide Area radio communication network, and the second network may be a Short Range radio communication network or a Metropolitan Area System radio communication network as described above. The WiFi transceivers 703 may also be configured to transmit a probe response, an authentication response and/or an association response to the mobile client device via the second network.

In an embodiment, the virtual transceiver 711 may be used to route the various request messages received from an offload server to a desired WiFi transceivers 703 via a bank of RF switch 713. The desired WiFi transceiver 703 may be determined out of the plurality of WiFi transceivers 703 based on the location of the mobile client device. In another embodiment, instead of using the virtual WiFi transceiver 711, the CPU 701 may be configured to directly route the request messages to the desire WiFi transceiver 703 via a driver interface. For example, a software driver may be provided on the CPU 701 to route the request messages to the desire WiFi transceiver 703 via a software driver interface.

In another embodiment, the wireless access point 700 may be used in the mobile data offload method for data transmission between the mobile client device and the access point as described in FIGS. 5 and 6 above.

The plurality of WiFi transceivers 703 may be configured to transmit downlink data to the mobile client device via the second network.

In an embodiment, the virtual transceiver 711 may be used to fake one or more packets as if the packets originate from the mobile client device, and to send the faked packets to a desired wireless transceiver 703 determined out of the plurality of wireless transceivers 703. The desired WiFi transceiver 703 may be determined out of the plurality of WiFi transceivers 703 based on the location of the mobile client device. The MAC address of the virtual transceiver 711 needs to be modified to mimic the packet that is sent from the distant client device.

In another embodiment, instead of using the virtual WiFi transceiver 711, the CPU 701 may be configured to directly generate the required messages/frames, such as CTS and ACK messages, and send the generated messages/frames to the desire WiFi transceiver 703 via a driver interface. For example, a software driver may be provided on the CPU 701 to generate and send the required messages/frames via a software driver interface. This is an alternative method that can be used to mimic the required transmission from the mobile client.

Figure 8:
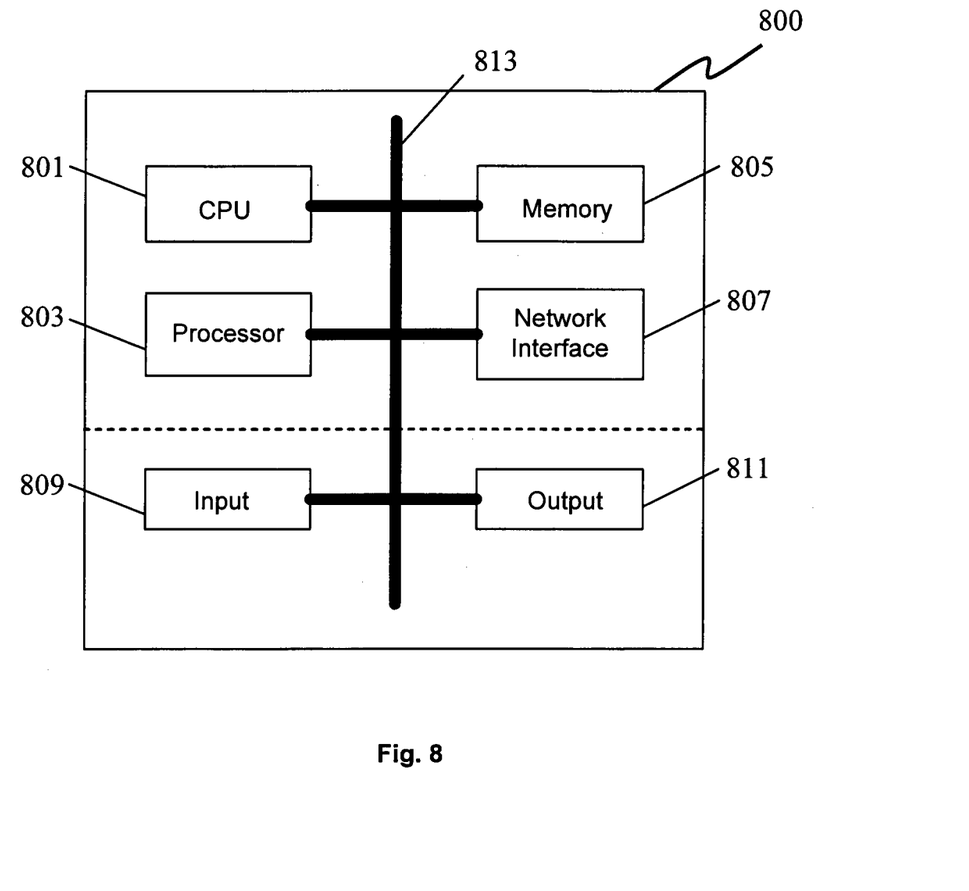
FIG. 8 shows a schematic diagram of a mobile client device according to an embodiment.

FIG. 8 shows a schematic diagram of a mobile client device according to an embodiment.

The mobile client device 800 may be implemented by a computer system, and may be used in the offload method of FIGS. 3-6 above. The computer system may include a CPU 801 (central processing unit), a processor 803, a memory 805, a network interface 807, input interface/devices 809 and output interface/devices 811. All the components 801,

803, 805, 807, 809, 811 of the computer system 200 are connected and communicating with each other through a computer bus 813.

The memory 805 may be used as for storing various messages or packets which are generated or received by the mobile client device 800 according to the method of the embodiments. The memory 805 may include more than one memory, such as RAM, ROM, EPROM, flash memory, hard disk, etc. wherein some of the memories are used for storing data and programs and other memories are used as working memories.

In an embodiment, the memory 805 may be configured to store instructions for the mobile data offload process as described in various embodiments above. The instructions, when executed by the CPU 801, may cause the CPU 801 to carry out the mobile data offload process as described in various embodiments above. The instruction may also cause the CPU 801 to store the various generated/received messages or packets according to the method of the embodiments in the memory 805.

In another embodiment, the processor 803 may be a special purpose processor for executing the instructions described above.

The CPU 801 or the processor 803 may be connected to a network through the network interface 807. In an embodiment, the network interface 807 may include a first interface providing access to a Cellular Wide Area radio communication network (e.g. a 3G network) and a second interface providing access to a Short Range radio communication network or a Metropolitan Area System radio communication network (e.g. a WiFi network).

The Input 809 may include a keyboard, a touch screen, a mouse, etc. The output 811 may include a display.

In one embodiment, the mobile client device 800 may include a transceiver (not shown) configured to transmit one or more probe requests, authentication requests and/or association requests to a wireless access point through the first interface via the Cellular Wide Area radio communication network and to transmit the one or more requests to the wireless access point throught the second interface via the Short Range radio communication network or the Metropolitan Area System radio communication network, respectively. The transceiver may also be configured to receive responses from the wireless access point through the second interface via the Short Range radio communication network or the Metropolitan Area System radio communication network. In one embodiment, the transceiver is embedded into the network interface 807. The transceiver may also be an external transceiver in another embodiment.

In an embodiment, the mobile client device 800 may further include a determining circuit configured to determine whether the mobile client device 800 receives an association response after the transmission of the association request in accordance with the offload method described above. The determining circuit may be implemented within the CPU 801 or the processor 803.

In another embodiment, the transceiver (not shown) may be configured to transmit uplink data to the wireless access point through the first interface via the Cellular Wide Area radio communication network, and to receive downlink data from the wireless access point through the second interface via the Short Range radio communication network or the Metropolitan Area System radio communication network.

In a further embodiment, the mobile client device 800 may include an interception circuit (not shown) configured to intercept uplink data to be transmitted to the wireless access point via the Short Range radio communication network or the Metropolitan Area System radio communication networkin accordance with the offload method described above. The interception circuit may be implemented within the CPU 801 or the processor 803.

In accordance with the above embodiment, the mobile client device 800 provides an intermediate layer for capturing the packets that are received from WiFi and sent out from the mobile device via WiFi. In various embodiments, the mobile client device 800 may also be configured to keep track of the packets that have been received via WiFi, inform the AP about the missing packets and report back via 3G network, split the outgoing packets for transmission via 3G network and incoming packets for transmission via WiFi, selectively route incoming packets via 3G, terminate the above special operation mode if the user terminates the application session, and split applications layer, session layer and networking layer protocols such as HTTP and TCP, between the 3G link uplink and WiFi downlink between the mobile client and the AP. These functions may be implemented as software instructions stored in the memory 805, or may be implemented as hardware circuits for carrying out the various functions.

Similar to the mobile client device above, the offload server as described above may also be implemented by a computer system shown in FIG. 8. The transceiver of the offload server may be configured to receive a probe request, an authentication request and/or an association request from a mobile client device via a Cellular Wide Area radio communication network; and to transmit the received probe request, the received authentication request and/or the received association request to a wireless access point via the Cellular Wide Area radio communication network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile data offload method for associating a mobile client device with a wireless access point, the method comprising:

transmitting a first authentication request from the mobile client device to the wireless access point via a first network, the first network being a Cellular Wide Area radio communication network;

transmitting a second authentication request from the mobile client device to the wireless access point via a second network, the second network being a Short Range radio communication network or a Metropolitan Area System radio communication network;

upon receiving at least one of the first authentication request and the second authentication request at the wireless access point, transmitting an authentication response from the wireless access point to the mobile client device via the second network; and upon receiving the authentication response at the mobile client device, associating the mobile client device with the wireless access point;

wherein transmitting the first authentication request via the first network comprises:

transmitting the first authentication request from the mobile client device to an offload server via the first network; and transmitting the first authentication request from the offload server to the wireless access point via the first network.

2. The method of claim 1, wherein the sequence of transmitting the first authentication request and transmitting the second authentication request is interchangeable.

3. The method of claim 1, wherein associating the mobile client device with the wireless access point comprises:
upon receiving the authentication response at the mobile client, transmitting a first association request from the mobile client device to the wireless access point via the first network;
transmitting a second association request from the mobile client device to the wireless access point via the second network;
upon receiving at least one of the first association request and the second association request at the wireless access point, transmitting an association response from the wireless access point to the mobile client via the second network.

4. The method of claim 1, further comprising:
after transmitting the authentication response from the wireless access point for a predetermined time period, transmitting one or more association responses continuously from the wireless access point to the mobile client via the second network;
transmitting an association request from the mobile client device to the wireless access point;
determining whether the mobile client device receives the one or more association responses after the transmission of the association request; and
associating the mobile client device with the wireless access point, if it is determined that the mobile client device receives the one or more association responses after the transmission of the association request.

5. The method of claim 1, further comprising:
before transmitting the first authentication request and the second authentication request from the mobile client device, transmitting a first probe request from the mobile client device to the wireless access point via the first network;
transmitting a second probe request from the mobile client device to the wireless access point via the second network; and
upon receiving at least one of the first probe request and the second probe request at the wireless access point, transmitting a probe response from the wireless access point to the mobile client via the second network.

6. A wireless access point comprising a plurality of wireless transceivers,
wherein the wireless transceivers are configured to receive one or more probe requests, authentication requests and/or association requests from an offload server via a first network and/or from a mobile client device via a second network, and the wireless transceivers are configured to transmit a probe response, an authentication response and/or an association response to the mobile client device via the second network;
wherein the first network is a Cellular Wide Area radio communication network, and the second network is a Short Range radio communication network or a Metropolitan Area System radio communication network;
wherein the wireless access point further comprises a virtual wireless transceiver or a driver, the virtual wireless transceiver or the driver being configured to route the probe requests, authentication requests and/or association requests to a desired wireless transceiver determined out of the plurality of wireless transceivers; and
wherein the desired wireless transceiver is determined based on the location of mobile client device.

7. The wireless access point of claim 6, wherein the wireless access point is a long range WiFi access point providing a radio range of more than 100 m.

8. The wireless access point of claim 6, wherein, the virtual wireless transceiver or the driver is further configured to fake one or more packets as if the packets originate from the mobile client device, and to send the faked packets to the desired wireless transceiver determined out of the plurality of wireless transceivers.

9. A mobile data offload method, comprising:
transmitting uplink data from a mobile client device via a first network, the first network being a Cellular Wide Area radio communication network; and transmitting downlink data to the mobile client device via a second network, the second network being a Short Range radio communication network or a Metropolitan Area System radio communication network,
wherein the method further comprises:
initiating the transmission of downlink data from a wireless access point to the mobile client device using a two-way handshake or a four-way handshake;
transmitting a data packet from the wireless access point to the mobile client device via the second network;
faking, at the wireless access point, an ACK packet as if the ACK packet originates from the mobile client device;
sending the ACK packet to a desired wireless transceiver of the wireless access point;
before transmitting the data packet, transmitting a RTS (Ready to send) message from the wireless access point to the mobile client device via the second network;
faking, at the wireless access point, a CTS (Clear to send) message as if the CTS message originates from the mobile client device; and
sending the CTS message to a desired wireless transceiver of the wireless access point.

10. The method of claim 9, further comprising:
upon receiving the data packet at the mobile client device, intercepting transmission of a data response packet from the mobile client device to the wireless access point via the second network; and
transmitting the data response packet from the mobile client device to the wireless access point via the first network.

11. The method of claim 9, further comprising
intercepting, at the mobile client device, the transmission of the uplink data via the second network.

* * * * *